No. 697,425. Patented Apr. 8, 1902.
E. KEMPSHALL.
MANUFACTURE OF GOLF BALLS.
(Application filed Mar. 6, 1902.)

(No Model.)

Witnesses:
James McConnell,
Fred E. Maynard.

Inventor:
Eleazer Kempshall.
By his Attorney.
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

MANUFACTURE OF GOLF-BALLS.

SPECIFICATION forming part of Letters Patent No. 697,425, dated April 8, 1902.

Application filed March 6, 1902. Serial No. 96,992. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in the Manufacture of Golf-Balls, of which the following is a specification.

This invention relates to playing-balls such as used in the game of golf and other games. Its object is to produce at low cost an efficient ball, having the quality of being "dead" when given a light blow and exceedingly lively when struck a heavy blow.

Figure 1:
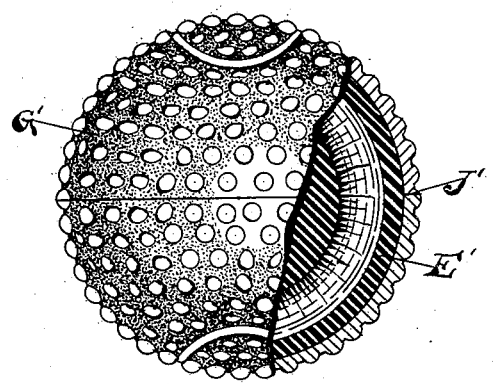
Figure 2:
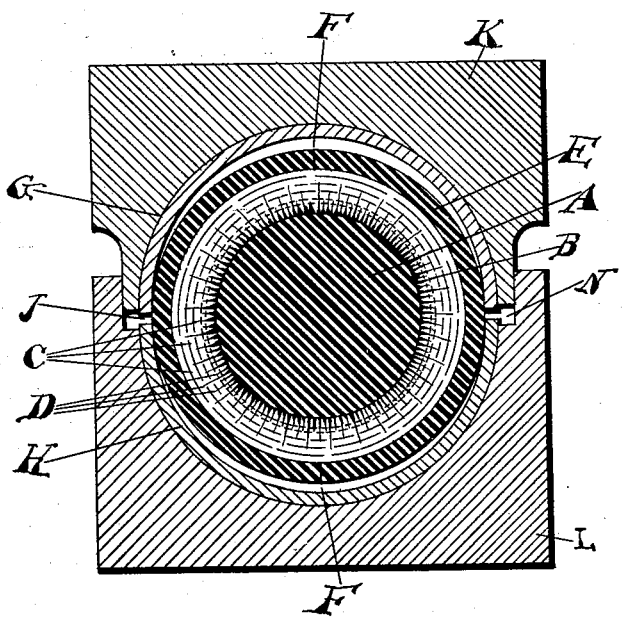

In the drawings forming a part of this specification, Figure 1 is a view of a ball made according to my improvements, being partly broken away so as to exhibit its construction. Fig. 2 illustrates a stage in the process of completing the ball.

I preferably employ a large core A, made of gutta-percha, which is preferably introduced in a fluid condition and hardened within a suitable rubber envelop B, the gutta-percha being forced into said envelop to such an extent as to materially expand said envelop, as set forth in an application filed by Francis H. Richards December 3, 1901, Serial No. 84,529, whereby the envelop, especially the exterior portion thereof, is put into a state of high longitudinal tension, as indicated by the broken curved lines C, the interior portion of the envelop is compressed by the exterior portion, as indicated by the radial lines D, and the core is held constantly under compression by said envelop. The combination of compressed core and distended envelop enhances the efficiency of the ball when struck a heavy blow. However, if desired, soft rubber may be otherwise employed for inclosing a core. Upon the compound rubber and gutta-percha filling I place a shell E, of gutta-percha, preferably in the form of hollow hemispheres, the joint between them being indicated at F. Said shell I provide with a cover, consisting of hemispheres G and H, of celluloid, the joint J, between these, extending crosswise of the joint F between the gutta-percha shells. The parts thus assembled I place between heating and pressing dies K and L, preferably in such a manner that the joint J of the celluloid cover lies the same way as the joint N in the dies. I then heat the dies and bring them together with great force, the heat rendering the celluloid plastic and enabling it to conform to the shape of the dies and also to weld at the joint J. Preferably the heat is sufficient to also soften the gutta-percha shell and enable it to weld at the joint F. I thus form a double shell upon the rubber and gutta-percha filling which possesses great strength and durability, particularly since the weld or joint at F runs crosswise with the weld or joint at J', Fig. 1. The gutta-percha is thus caused to form one complete sphere, as at E', and the celluloid another complete covering, as at G'. The pressure of the dies compacts and solidifies both the celluloid and gutta-percha components of the shell, the confined mass of rubber and gutta-percha being sufficiently resisting to support the comparatively weak material of the shell under any desired degree of pressure of the forming-dies. By having the joints of the double shell run crosswise of each other the body portions of the several segments respectively reinforce the joints, and hence the liability of bursting is minimized.

By providing a backing of gutta-percha in the shell I am enabled to employ, if desired, a thin plate of celluloid for the outer covering, thereby not only reducing the expense, but also making it possible to use celluloid in its most effective form, since a thin plate of this material possesses valuable characteristics not found or at least imperfectly developed in a thick plate. For one thing a thin cover of celluloid may be better seasoned than a thick or massive cover and it is more springy and pliant, while possessing the same wear-resisting, smooth, waterproof, and other qualities which render the ball desirable in the game of golf. At the same time I am enabled to use in the shell a large mass of gutta-percha, which possesses to a superlative degree the quality of storing up force from a blow, which is necessary in a golf-ball. It will be understood that it is important, in view of the small size of the balls used in this game and the necessity of its carrying or flying a great distance, to use in its construction such a combination of material as will utilize to advantage every portion of the mass of the ball, or, in other words, it is important to eliminate all dead-weight therefrom. Hence it is desirable not only to provide a core or filling having the desired qualities, but also to provide therefor a shell which not only protects said filling, but also itself contributes in a large degree to the flying power or efficiency of the ball, while preventing a light blow from affecting the highly elastic interior. This desideratum is obtained in this instance by reducing the thickness of the celluloid cover, so as to retain only enough thereof to provide a wear-resisting, waterproof, and otherwise satisfactory exterior for the balls and lining such cover with a relatively thick mass of gutta-percha, which not only has great carrying power, but is tough. The celluloid overcomes the objections to the use of a plain gutta-percha exterior, while all the advantages of the gutta-percha are retained.

A gutta-percha and celluloid shell may be otherwise formed within the scope of my improvements and may be used with other fillings than those herein specifically mentioned.

The herein-described playing-ball is made the subject-matter of my pending application, Serial No. 90,442, filed January 20, 1902.

Having described my invention, I claim—

1. A process in producing playing-balls, consisting in providing a core with a thick solid rubber envelop and forming thereon under heat and pressure a shell of gutta-percha and celluloid.

2. A process in producing a playing-ball, consisting in providing a core of gutta-percha with a solid rubber envelop and heating and compressing thereon a shell consisting partially or wholly of celluloid and gutta-percha.

3. A process in producing a playing-ball, consisting in compressing a body of soft rubber between a hard core and a multiple-layer shell while the latter is in a plastic condition, and causing said shell to harden while compressed, thereby to hold said rubber under permanent compression.

4. A process in forming a playing-ball, consisting in providing a spherical gutta-percha core with a highly-vulcanized firm rubber envelop, compressing upon said envelop a heated shell comprising a layer of plastic material and an outer layer of celluloid, and causing said shell to harden while under compression.

5. A process in forming a playing-ball, consisting in providing a spherical gutta-percha core with a highly-vulcanized firm rubber envelop, compressing upon said envelop a heated shell of gutta-percha and celluloid, and causing said shell to harden while under compression.

6. A process in forming a playing-ball, consisting in combining a spherical core of hard material with a thick rubber envelop, providing said envelop with a hard shell, compressing upon said shell heated segments of celluloid, and causing said celluloid to harden while under compression.

7. A process in forming a playing-ball, consisting in combining a spherical core of hard material with a highly-vulcanized thick rubber envelop, compressing upon said envelop heated hemispherical segments of gutta-percha and celluloid, so as to compact and weld said segments and also place said rubber under compression, and causing the gutta-percha and celluloid to harden while under compression.

8. A process in producing playing-balls, consisting in compressing a plastic shell consisting of gutta-percha and celluloid upon a soft-rubber and gutta-percha filling so as to put said rubber in a state of compression, and hardening said shell while under compression.

9. A process in producing playing-balls, consisting in heating a previously-formed gutta-percha and celluloid shell and compressing it upon a sphere of soft rubber which contains a core of gutta-percha.

10. A process in making playing-balls, consisting in heating and pressing celluloid and gutta-percha shell-segments together over a soft-rubber sphere containing a core of gutta-percha, so as to compress the soft rubber and also to cause the edges of the shell-segments to unite or weld, and hardening the shell while under compression.

11. A process in making playing-balls, consisting in placing a gutta-percha sphere between hemispheres of soft rubber, pressing hot gutta-percha and celluloid shell-segments together over said filling so as to cause the edges of the segments to unite, to compress the soft rubber and also to compress the shell to final size, and causing the shell to harden while under compression.

12. A process in making playing-balls, consisting in making a filling at least partially of gutta-percha and highly-vulcanized soft rubber, making hemispherical gutta-percha and celluloid shell-segments, heating and compressing the segments over the filling, so as both to compress the latter and also to cause the edges of the segments to weld or unite, the joints or welds crossing, and hardening the shell while under compression.

13. A process in making playing-balls, consisting in inclosing a soft-rubber sphere in a shell of gutta-percha, putting the ball thus formed in a shell of celluloid, subjecting the ball thus formed to heat and compression, and maintaining the compression until the celluloid and gutta-percha harden.

14. A process in making playing-balls, consisting in inclosing a soft-rubber sphere in a shell of gutta-percha, putting the ball thus formed between segments of celluloid, subjecting the ball thus formed to heat and compression, so as to weld said segments and compress said rubber, and maintaining the compression until the celluloid and gutta-percha harden.

ELEAZER KEMPSHALL.

Witnesses:
B. C. STICKNEY,
WM. H. DE LACY.